US011744186B2

(12) United States Patent
Myers et al.

(10) Patent No.: US 11,744,186 B2
(45) Date of Patent: Sep. 5, 2023

(54) DECORATIVE STRUCTURE INCLUDING AT LEAST ONE STRUCTURAL FEATURE, SYSTEMS INCLUDING AT LEAST ONE RELEASABLY ATTACHED ACCESSORY, AND RELATED METHODS

(71) Applicant: West Canyon Ridge, LLC, Salem, UT (US)

(72) Inventors: Lara Ann Myers, Salem, UT (US); Russell Roy Myers, Salem, UT (US)

(73) Assignee: West Canyon Ridge, LLC, Salem, UT (US)

( * ) Notice: Subject to any disclaimer, the term of this patent is extended or adjusted under 35 U.S.C. 154(b) by 0 days.

(21) Appl. No.: 17/514,611

(22) Filed: Oct. 29, 2021

(65) Prior Publication Data

US 2022/0132745 A1 May 5, 2022

Related U.S. Application Data

(60) Provisional application No. 63/108,147, filed on Oct. 30, 2020.

(51) Int. Cl.
*A01G 5/02* (2006.01)
*F16B 1/00* (2006.01)

(52) U.S. Cl.
CPC .................. *A01G 5/02* (2013.01); *F16B 1/00* (2013.01); *F16B 2001/0035* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,761,233 A * | 9/1956 | Brown | ..................... | A01G 5/04 47/41.12 |
| 3,110,647 A * | 11/1963 | Tong | ........................ | A41G 1/00 428/10 |
| 3,591,442 A * | 7/1971 | Matesi | ..................... | A01G 5/04 428/17 |
| 3,819,458 A * | 6/1974 | Kinderman | .............. | A41G 1/00 428/10 |
| 6,667,079 B1 * | 12/2003 | Glenn | ...................... | A01G 5/04 211/88.03 |
| 7,217,446 B2 * | 5/2007 | Moody | ................... | G09F 19/00 428/7 |
| 8,137,768 B1 * | 3/2012 | Chen | ...................... | A47G 33/00 428/7 |
| 9,807,944 B2 * | 11/2017 | Kendall | ................... | A01G 5/04 |
| 10,375,897 B2 * | 8/2019 | Tetreault | .................. | A01G 5/04 |
| 2006/0147654 A1 * | 7/2006 | Bopp | ....................... | A01G 5/04 428/542.2 |
| 2007/0029222 A1 * | 2/2007 | Shepardson | ............. | B44C 5/06 206/457 |
| 2016/0174468 A1 * | 6/2016 | Adams | ..................... | F16B 1/00 428/99 |

* cited by examiner

*Primary Examiner* — Monica E Millner
(74) *Attorney, Agent, or Firm* — Bretton L. Crockett; TechLaw Ventures, PLLC

(57) ABSTRACT

The present disclosure relates to systems and structures on which decorative wreaths can be assembled. Such systems may be designed to allow accessory(ies) to be impermanently attached or coupled to a main member or base structure. In one illustrative embodiment, a suitable system may contain at least one location where accessory(ies) may be coupled and uncoupled quickly and easily with no prescribed design or arrangement method.

20 Claims, 6 Drawing Sheets

DECORATIVE STRUCTURE INCLUDING AT LEAST ONE STRUCTURAL FEATURE, SYSTEMS INCLUDING AT LEAST ONE RELEASABLY ATTACHED ACCESSORY, AND RELATED METHODS

CROSS-REFERENCE TO RELATED APPLICATION

This application claims the benefit of U.S. Provisional Application No. 63/108,147, filed Oct. 30, 2020, which is incorporated herein by reference in its entirety, including but not limited to those portions that specifically appear hereinafter

TECHNICAL FIELD

The present disclosure relates generally to wreaths and, more particularly, to a structure supporting the wreath and the method of attachment of accessories.

BACKGROUND

Wreath structures have long been formed from live or artificial plants (e.g., branches, vines, or boughs). These wreath structures have been then ornately decorated with items, such as pinecones, ribbons, and additional decorations or accessories. Some conventional decorations have been held to the wreath structure by means of string or wire. The accessories were wrapped with string or wire and fastened directly to the wreath structure. This method of creating a wreath structure and then individually fastening attachments to a wreath is time-consuming and involves a considerable amount of manual labor. Another conventional method of creating a structure and attaching accessories includes using glue or premanufactured forms as a permanent attachment method.

Manufacturing custom wreaths is labor intensive and due to the onslaught of mass-produced styles and designs, consumers have become cost sensitive. Some consumers who prefer a unique design choose to assemble wreaths with wreath forms by permanently attaching individual accessories such as "picks", ribbons, or signs. This method is limited to those with an artistic ability and is difficult to replicate.

Permanently manufactured wreath forms or permanently affixed accessories has proliferated into the manufacturing of wreaths for every occasion. These wreaths manufactured for a specific occasion are then discarded or require unique storage locations with a limited fashionable lifetime.

SUMMARY

The present disclosure relates to systems and structures on which decorative wreaths can be assembled. Such systems may be designed to allow accessory(ies) to be impermanently attached or coupled to a main member or base structure. In one illustrative embodiment, a suitable system may contain at least one location where accessory(ies) may be coupled and uncoupled quickly and easily with no prescribed design or arrangement method.

In one illustrative aspect, systems in accordance with the teachings of the present disclosure may relate to structures on which a user can assemble and disassemble a wreath. For example, such a structure may be used to hold or shape an impermanent wreath including a primary accessory(ies) such as vines or boughs to form any desired shape such as round, square, heart, oval, etc. Optionally, a secondary attachment(s) may be coupled to at least one predefined location on the structure. Such secondary attachment(s) can be fastened or adhered to a coupling structure and coupled or fastened to the main structure.

In one illustrative embodiment, a wreath structure may comprise: a main or base wreath structure; at least one primary accessory that would cover at least a portion of the base wreath structure; and at least one secondary accessory that is coupled to a pre-defined location on the base wreath structure.

In another illustrative embodiment, a wreath structure may comprise: a main or base wreath structure; at least one primary accessory that would cover at least a portion of the base wreath structure; and a plurality of secondary accessories coupled to a predefined location on the base wreath structure.

In some illustrative embodiments, a coupling structure may be configured to couple or fasten to a predefined location on the main wreath structure. In other embodiments, a coupling structure may be affixed to a secondary attachment.

Features from any of the disclosed embodiments may be used in combination with one another, without limitation. In addition, other features and advantages of the present disclosure will become apparent to those of ordinary skill in the art through consideration of the following detailed description and the accompanying drawings.

DESCRIPTION OF THE DRAWINGS

It will be appreciated by those of ordinary skill in the art that the various drawings are for illustrative purposes only. The nature of the present disclosure, as well as other embodiments of the present invention, may be more clearly understood by reference to the following detailed description, to the appended claims, and to the several drawings.

DETAILED DESCRIPTION

The following detailed description and appended drawings describe and illustrate various embodiments of systems and apparatus in accordance with the present disclosure. The descriptions and drawings serve to enable one skilled in the art to make and use systems and apparatus in accordance with this disclosure and are not intended to limit the scope of the disclosure in any manner.

One aspect of systems in accordance with the present disclosure relate to a structure that provides an impermanent wreath form to which one or more accessories can be releasably attached. Optionally, at least one location for a secondary accessory to be releasably attached or coupled may be provided. Such a configuration may provide users with the ability to independently create, modify, and adjust the aesthetic and artistic appeal of a wreath to the specific season or taste of the user.

In some illustrative embodiments, a system in accordance with the principles of the present disclosure may include a main member that has a base formed generally as an elongated plank with a generally planar bottom and an opposite planar upper surface, which is formed into a desired shape, such as a circular member, an oval, an arc, etc. A plurality of connecting structures or guides which may be generally formed as columns, extend out from the upper surface allowing decorative materials to be disposed thereon. Coupling members may be releasably connected to the guides to retain the decorative materials and can be structured to retain additional decorative elements.

Figure 1:
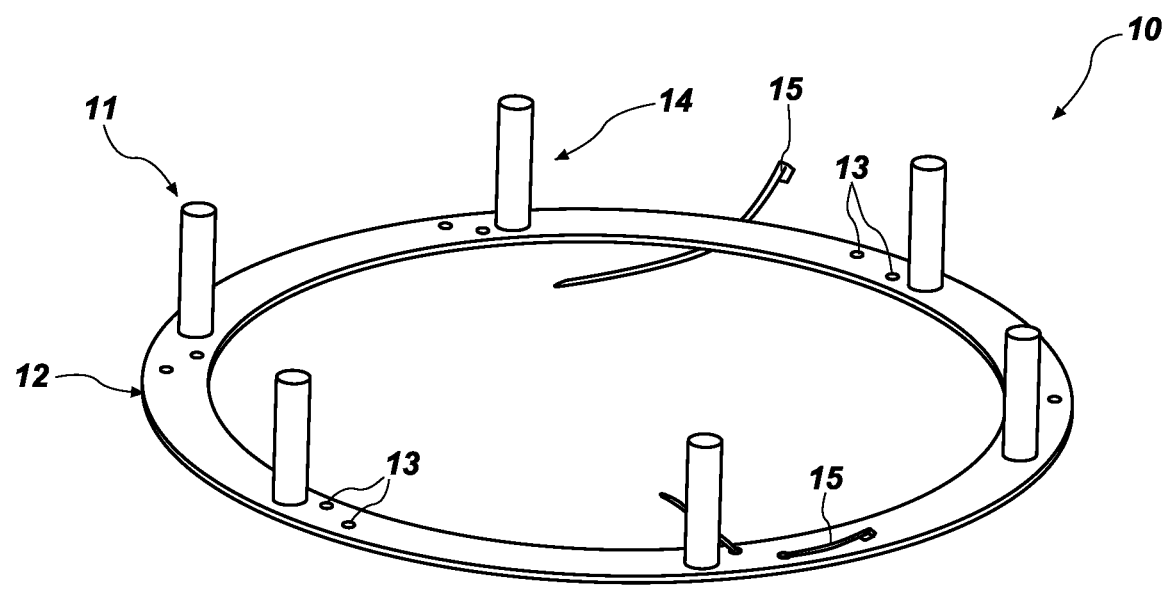
FIG. 1 is an isometric view of one illustrative embodiment of a main structure on which a wreath can be formed or assembled according to an embodiment of the present disclosure.
Figure 2:
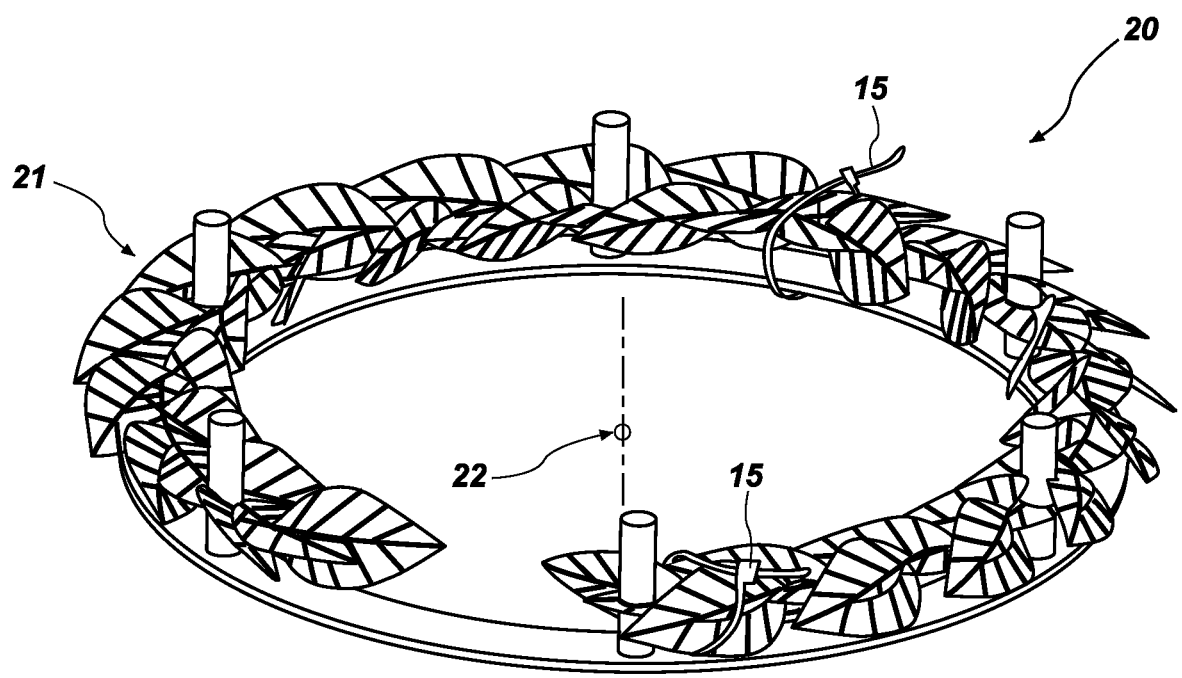
FIG. 2 is an isometric view of the main structure FIG. 1 with an impermanent primary accessory such as a vine or bough attached to the main structure.

FIGS. 1-3A illustrate a first exemplary embodiment of a suitable base or main structure 10 with which impermanent primary accessory(ies) may be used to create a wreath. As depicted, main structure 10 can be made of any suitable material (e.g., vine, wood, plastic, metal, glass, organic) without limitation. In one embodiment, as shown in FIG. 1, a main connecting structure 12 may have a substantially annular shape. One or more securing ports 13, may be disposed in the connecting structure or base 12, allowing a fastener, such as the depicted zip tie 15 to be passed therethrough. It will be appreciated that ports 13 may be singular, disposed as pairs (as depicted) or in sets depending on a particular embodiment. Additionally, any suitable fastener may be sued with the ports, including string, twin, zip ties, twist fasteners, etc. As shown in FIG. 2, the fastener 15 may be used to secure an accessory to the base. It will be appreciated that fasteners may also be placed around the base rather than through ports 13, where needed for securing.

One or more guide feature(s) 14 may extend laterally from the main connecting structure 12. As depicted, these guide features may extend parallel to one another in a first direction. Such a configuration may create a structure to use as a wreath form 20 around a substantially central axis 22. Each one or more guide feature(s) 14 may function as a structure for accommodating at least one main accessory 21. Explaining further, in one example, one or more wreath material(s) may be positioned between at least two of the guide features 14 such that the wreath material is at least partially held in place thereby. In some embodiments, the guide features 14 may sufficiently secure the main accessory 21, such that no fasteners 15 need be used. It will be appreciated that in different embodiments, the size, shape, and/or length of the at least one guide feature 14 (individually or collectively) may be selected (e.g., increased or decreased relative to FIG. 1) based on preference or structure size. The one or more guide feature 14 may be positioned in any configuration, without limitation, In one embodiment, the at least one guide feature 14 may be positioned in a uniform radial pattern location, such as the 6 guide features 32 shown in FIG. 3, which are positioned at 60 degree angles between each circumferentially adjacent guide feature 31 (i.e., when viewed from a top view and wherein the angle is formed between one guide feature 31, the center the axis of the main structure 33, and a circumferentially adjacent guide feature 31).

Figure 3A:
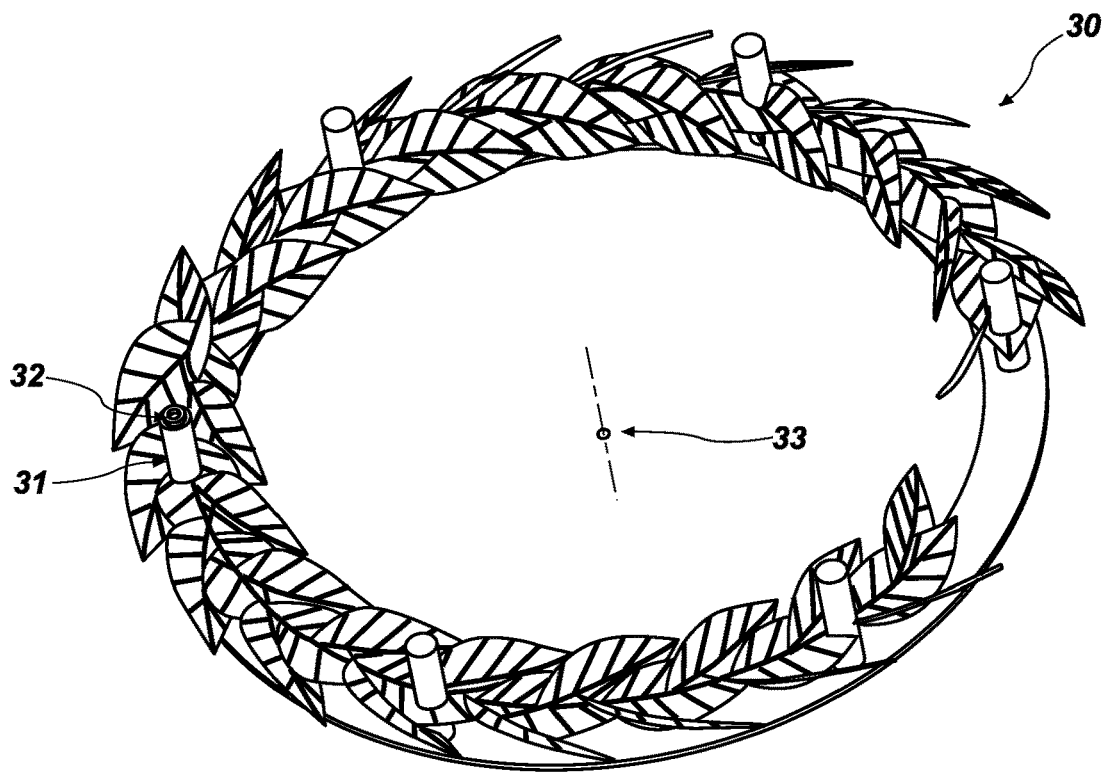
FIG. 3A is an assembled isometric view of the main structure shown in FIG. 1 illustrating a symmetric array of guide features or predefined locations that may permit a coupling attachment.
Figure 3B:
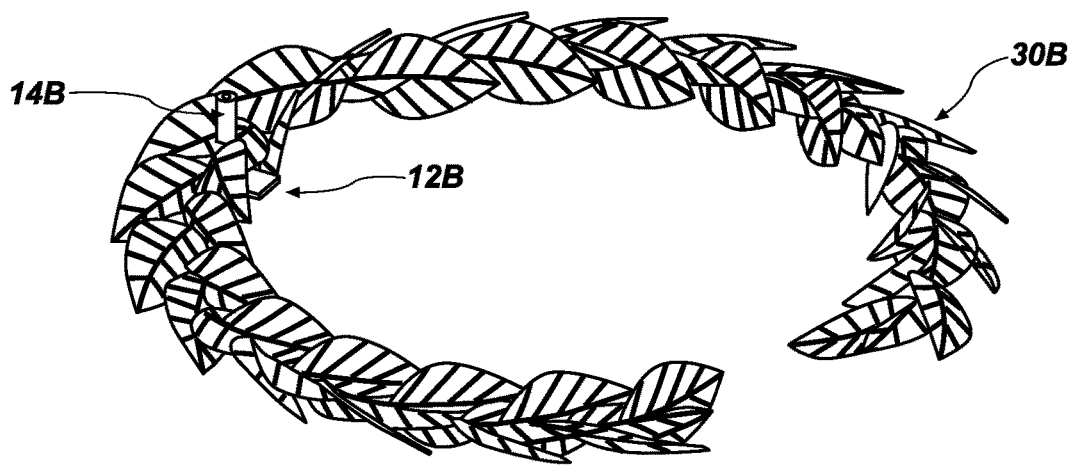
FIG. 3B is an assembled isometric view of an alternative embodiment illustrating a main structure having an alternative shape allowing for non-continuous assembled decorative wreath.
Figure 4:
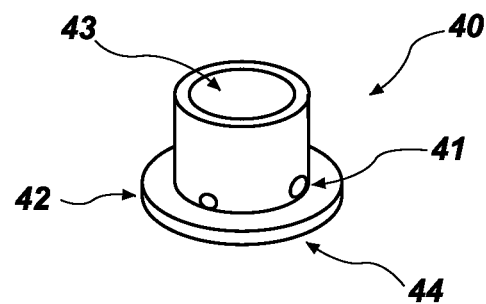
FIG. 4 is an isometric view of an illustrative embodiment of one suitable coupling attachment structure to which a secondary accessory may be affixed and coupled to a main structure, similar to that depicted in FIG. 1.

Guide features 14, as shown in FIG. 1, may each provide a predefined location 11 for releasably coupling a coupling attachment structure 40, one illustrative embodiment of which is shown in FIG. 4. FIG. 3 illustrates a guide feature 31 with an exemplary coupling mechanism 32 attached at the predetermined coupling location. A coupling mechanism 32 may be, but is not limited to, a type of magnet and/or a ferrous metal. A coupling mechanism 32 may be attached to a guide feature 31 by any means (e.g., screw, adhesive, press fit, etc.). In the depicted embodiment, the coupling mechanism 32 may be disposed on a top end of the guide feature, but it will be appreciated that it may be placed at other locations on the guide feature. Alternatively, the guide feature 14 itself may be a type of magnet or ferrous metal. The length of the guide feature(s) 14 may be selected based on a desired function and may or may not be visible after applying the accessory(ies) 21. Additionally, a guide feature 14 may or may not be permanently coupled to the connecting structure 12. In one example, a guide feature 14 may be formed from the main structure 12 (e.g., by deforming the main structure 12 to form the guide feature 14). In another example, the guide feature 14 may be releasably attached to the main structure 12. It will be appreciated that in addition to magnets other connecting structures, such as a threaded guide feature may be used.

FIG. 3B illustrates an assembled exemplary embodiment of a system 30B forming a wreath that is non-continuous, having a gap therein. This system 30B includes a main structure 12A that is not a continuous ring but may be a smaller member. As depicted, it may be a relatively shorter member, but it will be appreciated that members formed as arcs or open sided polygons may be used. Guide feature 14B rises from main member 12B and is similar to guide feature 14 discussed elsewhere in this disclosure.

FIGS. 4-10 illustrate some exemplary embodiments of a coupling attachment structure and secondary accessory coupling mechanism.

Figure 5:
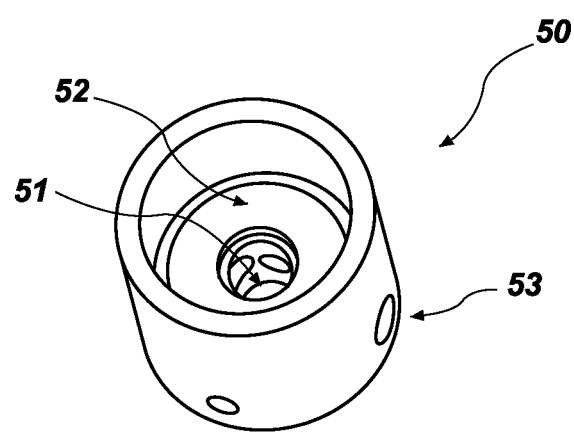
FIG. 5 is another isometric view of a coupling attachment structure to which a secondary accessory may be affixed and coupled to a main structure, similar to that depicted in FIG. 1.
Figure 6:
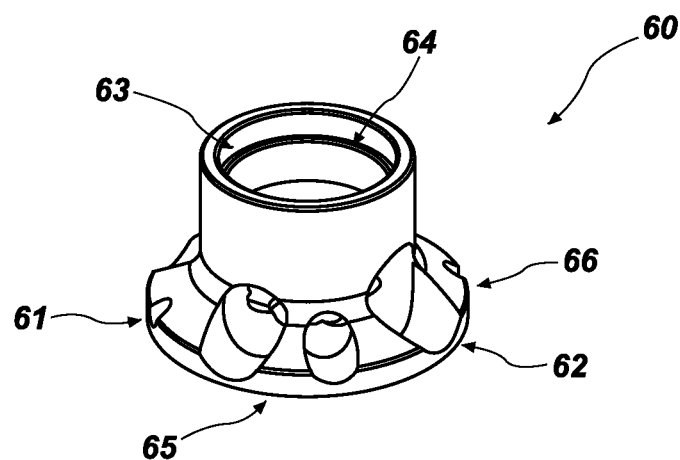
FIG. 6 is another view of a coupling attachment structure to which a secondary accessory may be affixed and coupled to a main structure, similar to that depicted in FIG. 1.
Figure 7:
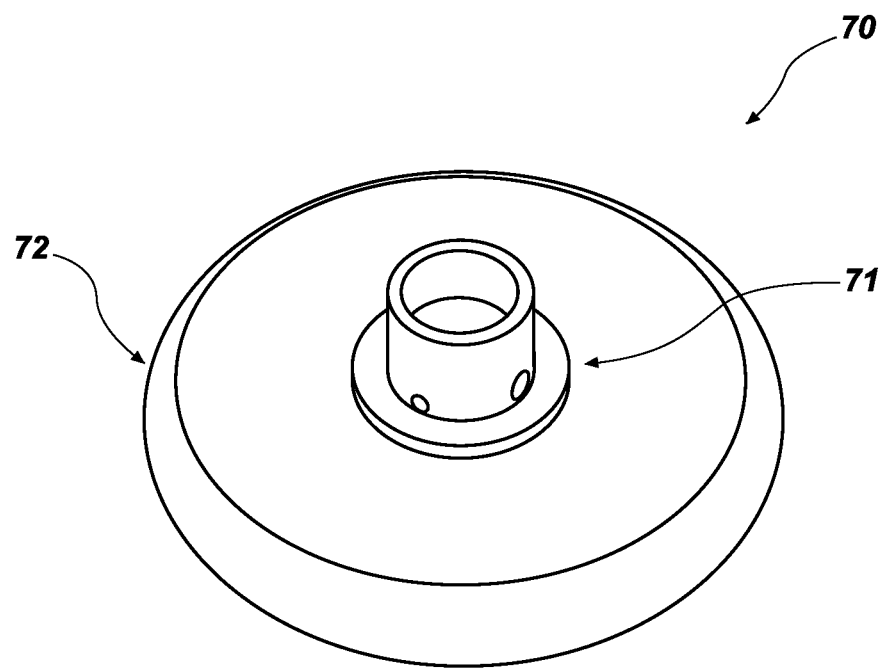
FIG. 7 is an assembled isometric view where a secondary accessory is affixed to the coupling structure shown in FIG. 4.
Figure 8:
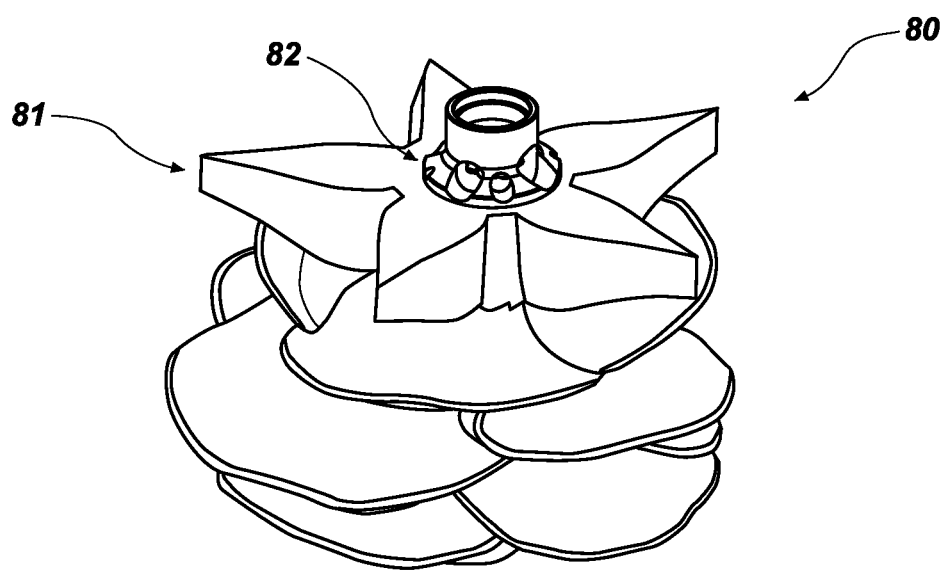
FIG. 8 is an assembled isometric view where a secondary accessory is affixed to the coupling structure shown in FIG. 6.

An exemplary illustration of one embodiment of a coupling structure 40 is shown in FIG. 4. Additional exemplary structures 50, 60 are shown in FIG. 5 and FIG. 6. As shown in FIGS. 4,5, and 6, coupling structure 40 may include a recess 43 or a multiplicity of recesses 63, 64. In such an embodiment, coupling structures 40, 50, 60 may be releasably attached to the main structure 10 at a predetermined location 11. This may be accomplished by positioning the coupling structure recess 43 over the guide feature 14 and releasably coupling the coupling structure 40 to the guide feature 14 using any method that maintains the coupling structure 40 at a predefined location 11. FIG. 5 provides an exemplary illustration of one embodiment of a coupling mechanism 52. In one example, a coupling mechanism 52 may be, but is not limited to, a magnet or ferrous metal that can be releasably coupled with coupling mechanism 32. In another example, a coupling mechanism 52 may be attached or retained by the coupling structure 50 by a fastener, glue, or any other means (e.g., screw, adhesive, press fit, etc.). In one embodiment, a coupling structure 50 may be completely constructed or partially constructed of a magnetic or ferrous material that allows coupling to the coupling mechanism 32. In another embodiment, coupling to a predefined location 11 may be accomplished without the use of a coupling recess 43 using other attachment methods that are sufficient to hold the coupling structure 40 and/or secondary accessory at a predefined location 11. For example, coupling structure 40 may be releasably attached to main structure 10 by any suitable configuration (e.g., fitted sleeve, twist lock, screw connection, magnetic, etc.), without limitation.

Coupling structure 40, 50, 60 may contain one or more recess(es) 41, 51, 61, 62 and/or location(s) 44, 65 where secondary attachments 72, 81 can be affixed to the coupling structure 30. As shown in FIGS. 4, 5, and 6, coupling structures 40, 60 may optionally provide feature 42, 66 opposite or angled from the affixed secondary accessory 72, 81 affixing location 44, 65. Such a configuration may allow a user to grip and facilitate the removal of the assembled coupling structure 70, 80 without damaging the secondary accessory 72, 81 or putting undue stress on the affixed interface 71, 82. The main accessory 21 and secondary accessory(ies) 72, 81 may be any suitable material, shape, size or design, without limitation. Both the main accessory 21 and secondary accessory(ies) 72, 81 may be any suitable material, shape, size, or design, without limitation. The embodiments disclosed herein are not limited relative to the method for decorating. Rather, any user preference may be accommodated (e.g., the radial and lateral placement of the predetermined location(s) 11).

Figure 9:
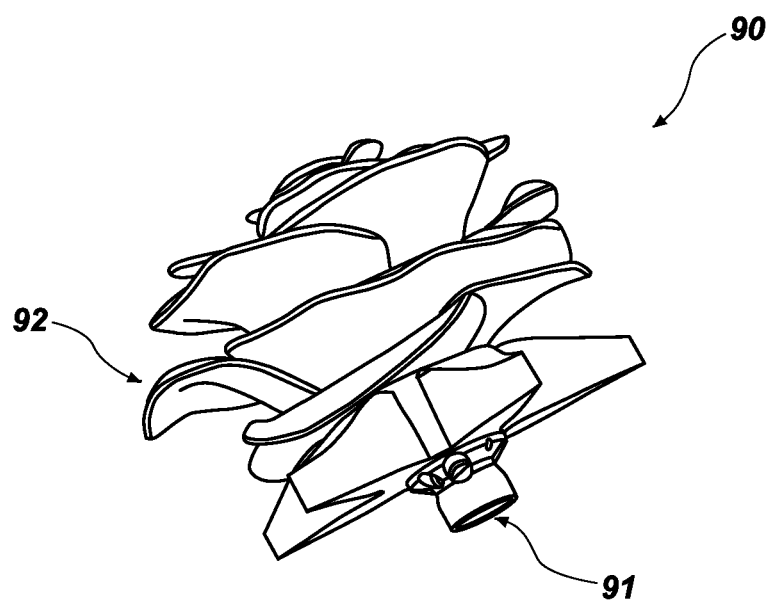
FIG. 9 is an assembled isometric view where a secondary accessory is affixed to the coupling structure shown in FIG. 6.
Figure 10:
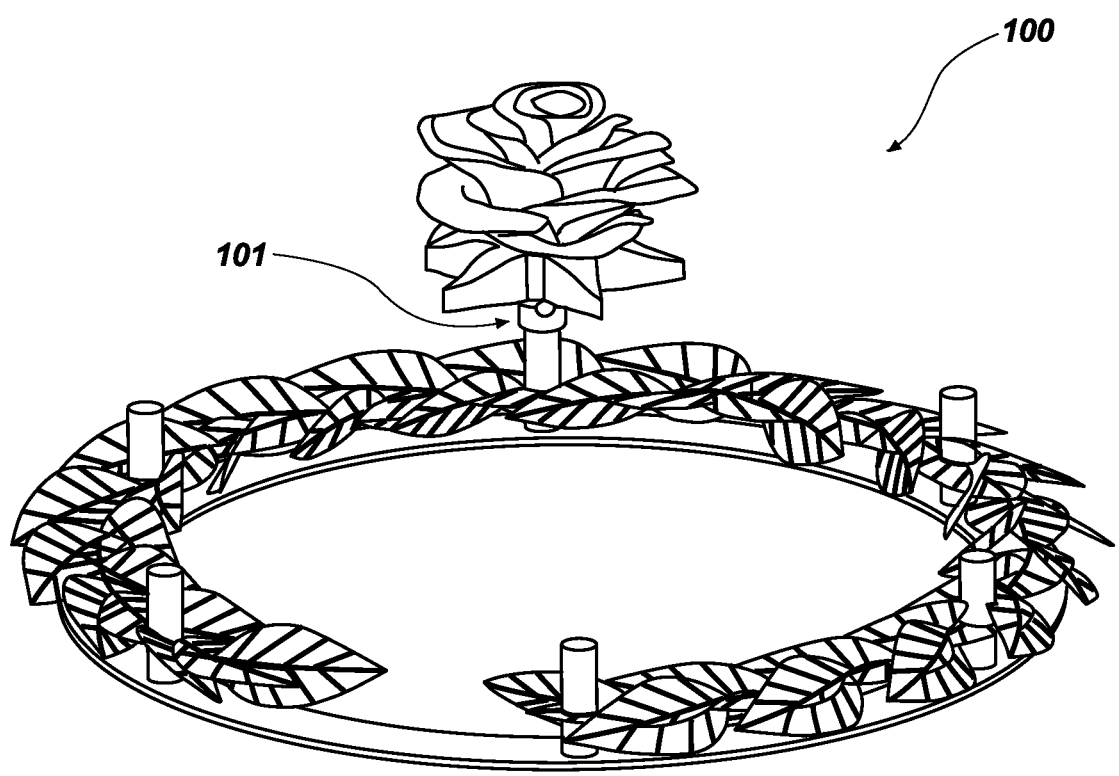
FIG. 10 is an assembled isometric view where a coupling attachment structure with an affixed secondary accessory is coupled to the main structure shown in FIGS. 1 and 2.

An exemplary illustration of the coupling structure 60 shown assembled 90 to a secondary accessory 92 is shown in FIG. 9. Coupling assembly 90 may be releasably coupled to the main structure 11 by aligning the coupling recess 91 and the predetermined location 11 as shown in FIG. 10.

While various aspects and embodiments have been disclosed herein, other aspects and embodiments are contemplated. The various aspects and embodiments disclosed herein are for purposes of illustration and are not intended to be limiting. Accordingly, other embodiments may be within the scope of the following claims. Additionally, the words "including," "having," and variants thereof (e.g., "includes" and "has") as used herein, including the claims, shall be open-ended and have the same meaning as the word "comprising" and variants thereof (e.g., "comprise" and "comprises").

What is claimed is:

1. A reusable decorative wreath system comprising:
    a main member including a base and at least one guide generally formed as a column extending out from an upper surface and including a connection feature;
    at least one coupling member including a counterpart connection feature that is releasably connectable to the connection feature on the at least one guide to thereby retain a first decorative material disposed on the main member, wherein the at least one coupling member further comprises at least one a decorative element connection recess structured to retain an additional decorative element secured to at least one connection recess.

2. The system of claim 1, wherein the main member is formed into a circular shape.

3. The system of claim 1, wherein the at least one guide comprises a plurality of guides, each generally formed as a column extending out from the upper surface and including a connection feature.

4. The system of claim 3, wherein the at least one coupling member comprises a plurality of coupling members, each including a counterpart connection feature that is releasably connectable to the connection feature on a guide of the plurality of guides.

5. The system of claim 1, wherein the at least one decorative element connection recess structured to retain an additional decorative element secured to at least one connection recess comprises a plurality of decorative element connection recesses formed in the at least one coupling member each of the plurality of decorative element connection recesses structured to retain additional decorative elements.

6. The system of claim 3, further comprising a secondary accessory configured to be releasably attachable to at least one guide.

7. The system of claim 5, wherein the secondary accessory is attached to at least one coupling member of the plurality of coupling members.

8. The structure in claim 6, wherein the at least one coupling member is attached to the secondary accessory by an adhesive or a magnet.

9. The system of claim 3, wherein the plurality of guides extend parallel to one another.

10. The system of claim 1, wherein the connection feature comprises a magnet.

11. The system of claim 10, wherein the counterpart connection feature comprises a magnet.

12. The system of claim 1, wherein the at least one guide is releasably fastened to the base.

13. The system of claim 1, wherein the base includes at least one mounting port for securing the first decorative material to the main member with a fastener passing therethrough.

14. A reusable structure for creating a decorative wreath, comprising:
    a base member having a generally planar bottom and an opposite planar upper surface; and
    a plurality of guide members, each guide member generally formed as a column extending out from the upper surface and including a connection feature,
    a plurality of coupling members, each coupling member including a counterpart connection feature that is releasably connectable to the connection feature on a guide member of the plurality of guide members to thereby retain a decorative material disposed on the main member, each of the plurality of coupling members further comprising a guide coupling recess for receiving an upper portion of a guide member and at least one decorative element connection recess structured to retain an additional decorative element secured to at least one connection recess.

15. The structure of claim 14, wherein at least one guide member is releasably fastened to the base.

16. The structure of claim 14, wherein the plurality of guides extend parallel to one another.

17. The structure of claim 14, wherein at least one the connection feature comprises a magnet.

18. A reusable decorative wreath system comprising:
    a main member including a base and at least one guide member, the guide member generally formed as a column extending out from the upper surface and including a connection feature;

at least one coupling member including a counterpart connection feature that is releasably connectable to the connection feature on the at least one guide member, and a gripping feature;

a secondary accessory fastened to the at least one coupling member opposite the gripping feature, such that the secondary accessory is displayed above any decorative material disposed on the main member.

19. The system of claim 18, wherein the at least one guide is releasably fastened to the base.

20. The system of claim 1, wherein the connection feature comprises a magnet.

* * * * *